(12) United States Patent
Chen et al.

(10) Patent No.: US 7,903,441 B2
(45) Date of Patent: Mar. 8, 2011

(54) POWER CONVERTER

(75) Inventors: Fu-Sung Chen, Taipei Hsien (TW);
Sen-Chi Lin, Taipei Hsien (TW);
Ming-Ho Huang, Taipei Hsien (TW)

(73) Assignee: Chicony Power Technology Co., Ltd., Taipei Hsien (TW)

( * ) Notice: Subject to any disclaimer, the term of this patent is extended or adjusted under 35 U.S.C. 154(b) by 121 days.

(21) Appl. No.: 12/354,883

(22) Filed: Jan. 16, 2009

(65) Prior Publication Data
US 2010/0182812 A1 Jul. 22, 2010

(51) Int. Cl.
*H02M 7/00* (2006.01)
*H02M 7/515* (2007.01)

(52) U.S. Cl. ............ 363/101; 363/39; 363/135; 327/551

(58) Field of Classification Search .................. 327/551;
363/39.101, 135, 27
See application file for complete search history.

(56) References Cited

U.S. PATENT DOCUMENTS
5,077,486 A * 12/1991 Marson et al. ................ 205/728

* cited by examiner

*Primary Examiner* — Shawn Riley
(74) *Attorney, Agent, or Firm* — Muncy, Geissler, Olds & Lowe, PLLC

(57) ABSTRACT

The present invention discloses a power converter with low standby power consumption, used to convert an AC input power to an output DC power, comprising: an EMI filter, coupled to the AC input power to filter the EMI; a TRIAC, coupled to the EMI filter to access the AC input power; and a TRIAC driver, used for driving the gate of the TRIAC switch according to an on-off control signal from a loading device, to control the conduction of the TRIAC switch.

11 Claims, 2 Drawing Sheets

POWER CONVERTER

BACKGROUND OF THE INVENTION

1. Field of the Invention

The present invention relates to an AC-to-DC power converter, especially to an AC-to-DC power converter with low standby power consumption when in light load or empty load, used to comply with the green or power saving demand.

2. Description of the Related Art

To reduce the power consumption of an AC-to-DC power converter when in light load or empty load, a conventionally adopted solution is to place an additional switch device, such as a relay, at the entrance of an AC power to provide a mechanism for disconnecting the AC power and therefore comply with a standby demand. However, there are some drawbacks in placing the additional switch device at the entrance of an AC power. First, it may increase the production cost. Second, it may decrease the efficiency of the power conversion. Third, it may cause challenge to the heat dissipation. These drawbacks may deteriorate the performance of the AC-to-DC power converter, and cause vendors of the AC-to-DC power converter to suffer a higher operation expense. Therefore, there is a need to implement a cost effective AC-to-DC power converter with low standby power consumption when in light load or empty load, without deteriorating the efficiency of power conversion or heat dissipation.

To overcome the drawbacks of the conventionally adopted solution for implementing an AC-to-DC power converter with a standby demand, the present invention proposes a novel solution for the standby demand of an AC-to-DC power converter, needless of placing an additional switch device, such as a relay, at the entrance of an AC power to disconnect the AC power. The power converter of the present invention is designed to have a normal conversion mode and an AC power interruption mode. The power converter of the present invention can be enabled to operate in the normal conversion mode, or disabled to operate in the AC power interruption mode to comply with the standby demand of consuming extremely low power, when the loading condition is light load or empty load.

SUMMARY OF THE INVENTION

One objective of the present invention is to provide an AC-to-DC power converter with extremely low standby power consumption, needless of placing an additional switch device, such as a relay, at the entrance of an AC power to disconnect an AC power.

Another objective of the present invention is to provide an AC-to-DC power converter with extremely low standby power consumption, comprising a TRIAC switch for the control of AC power transmission in that the TRIAC switch can enable the power converter to operate in the normal conversion mode or disable the power converter to operate in the AC power interruption mode to comply with the standby demand of low power consumption.

To accomplish the foregoing objectives of the present invention, a power converter with extremely low standby power consumption for converting an input AC power to an output DC power is proposed, the power converter comprising: an EMI (Electro Magnetic Interference) filter, coupled to the AC input power to filter the EMI; a TRIAC switch, having a gate, a first channel terminal and a second channel terminal, the first channel terminal coupled to the EMI filter to access the AC input power; and a TRIAC driver, used for driving the gate of the TRIAC switch according to an on-off control signal from a loading device, to control the electric connection of the first channel terminal and the second channel terminal.

To make it easier for our examiner to understand the objective of the invention, its structure, innovative features, and performance, we use a preferred embodiment together with the accompanying drawings for the detailed description of the invention.

DETAILED DESCRIPTION OF THE PREFERRED EMBODIMENTS

Figure 1:
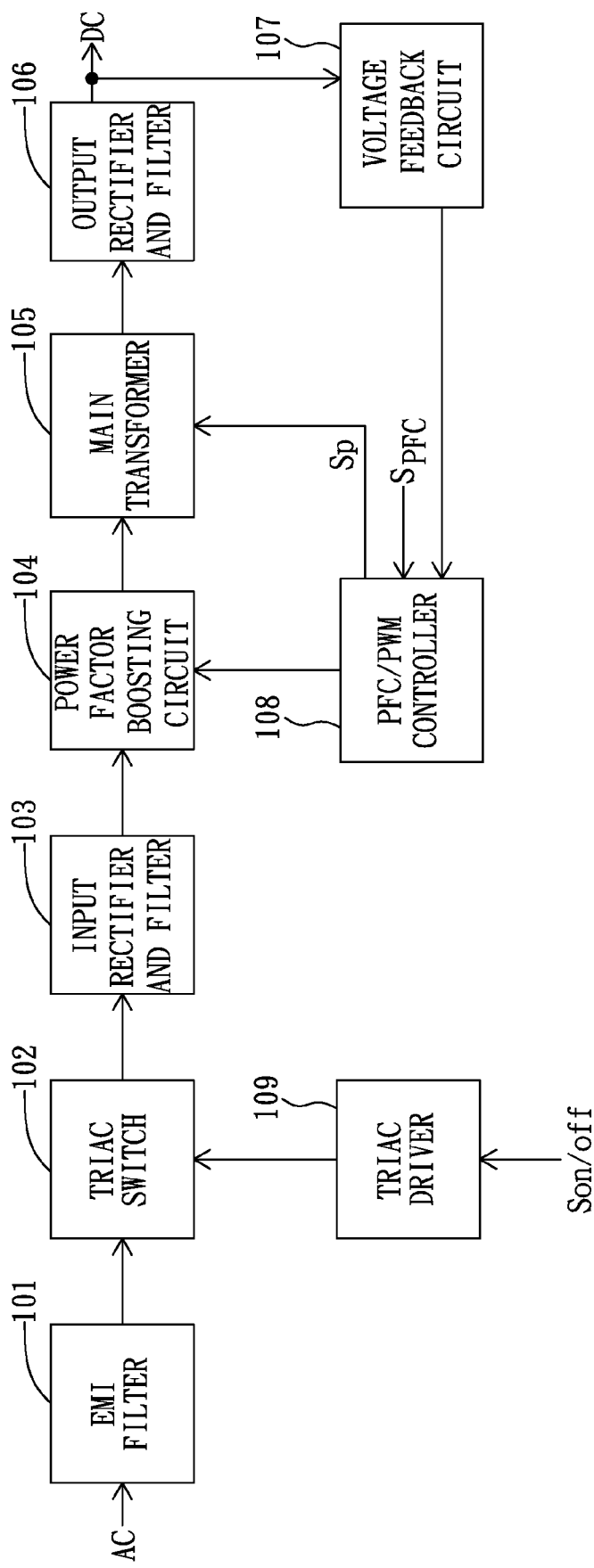
FIG. 1 is the block diagram of a power converter according to a preferred embodiment of the present invention.

Please refer to FIG. 1, which shows the block diagram of a power converter according to a preferred embodiment of the present invention. As shown in FIG. 1, the power converter with extremely low standby power consumption, for converting an input AC power to an output DC power according to the preferred embodiment of the present invention, can operate in a normal conversion mode or an AC power interruption mode. The power converter comprises an EMI filter 101, a TRIAC switch 102, an input rectifying and filtering unit 103, a power factor boosting circuit 104, a main transformer 105, an output rectifying and filtering unit 106, a voltage feedback circuit 107, a PFC/PWM controller 108, and a TRIAC driver 109.

In FIG. 1, the EMI filter 101 is placed between the input AC power and the TRIAC switch 102 to filter out possible EMI (Electro Magnetic Interference) generated in the power converter.

The TRIAC switch 102 has a gate, a first channel terminal and a second channel terminal. The first channel terminal is coupled to the EMI filter 101 to access the input AC power. The second channel terminal is coupled to the input rectifying and filtering unit 103. The gate is coupled to the TRIAC driver 109. The channel between the first channel terminal and the second channel terminal of the TRIAC switch 102 is either in conduction or in isolation according to the control of the TRIAC driver 109 through the gate. When the channel between the first channel terminal and the second channel terminal is in conduction, the power converter operates in the normal conversion mode. When the channel between the first channel terminal and the second channel terminal is in isolation, the power converter operates in the AC power interruption mode.

The input rectifying and filtering unit 103 is coupled to the second channel terminal of the TRIAC switch 102 to perform rectifying and filtering operation on the input AC power to provide a ripple voltage.

The power factor boosting circuit 104 is placed between the input rectifying and filtering unit 103 and the main transformer 105 to convert the ripple voltage to a first voltage to boost the power factor, under the control of the PFC/PWM controller 108.

The main transformer 105 is for generating a second voltage according to the first voltage.

The output rectifying and filtering unit 106 is for generating the output DC power according to the second voltage.

The voltage feedback circuit 107 is coupled to the output rectifying and filtering unit 106 to provide a feedback voltage to the PFC/PWM controller 108.

The PFC/PWM controller 108 is for generating a power factor driving signal to drive the power factor boosting circuit 104 according to a power factor correction sensing signal $S_{PFC}$, and for generating a pulse width modulation signal $S_P$ according to the feedback voltage to control power conversion of the main transformer 105.

The TRIAC driver 109 has a control side and a channel side. The control side is coupled to a switch signal $S_{on/off}$ of a loading device (not shown in FIG. 1). The channel side is coupled to the gate of the TRIAC switch 102. When the switch signal $S_{on/off}$ is at high level, the channel side will then generate a driving current to enable electrical connection of the first channel terminal and the second channel terminal of the TRIAC switch 102. When the switch signal $S_{on/off}$ is at low level, the channel side will then be off and cause electrical isolation of the first channel terminal and the second channel terminal of the TRIAC switch 102. The loading device can be any portable electrical equipment like a notebook PC, or an electronic book, etc.

Figure 2:
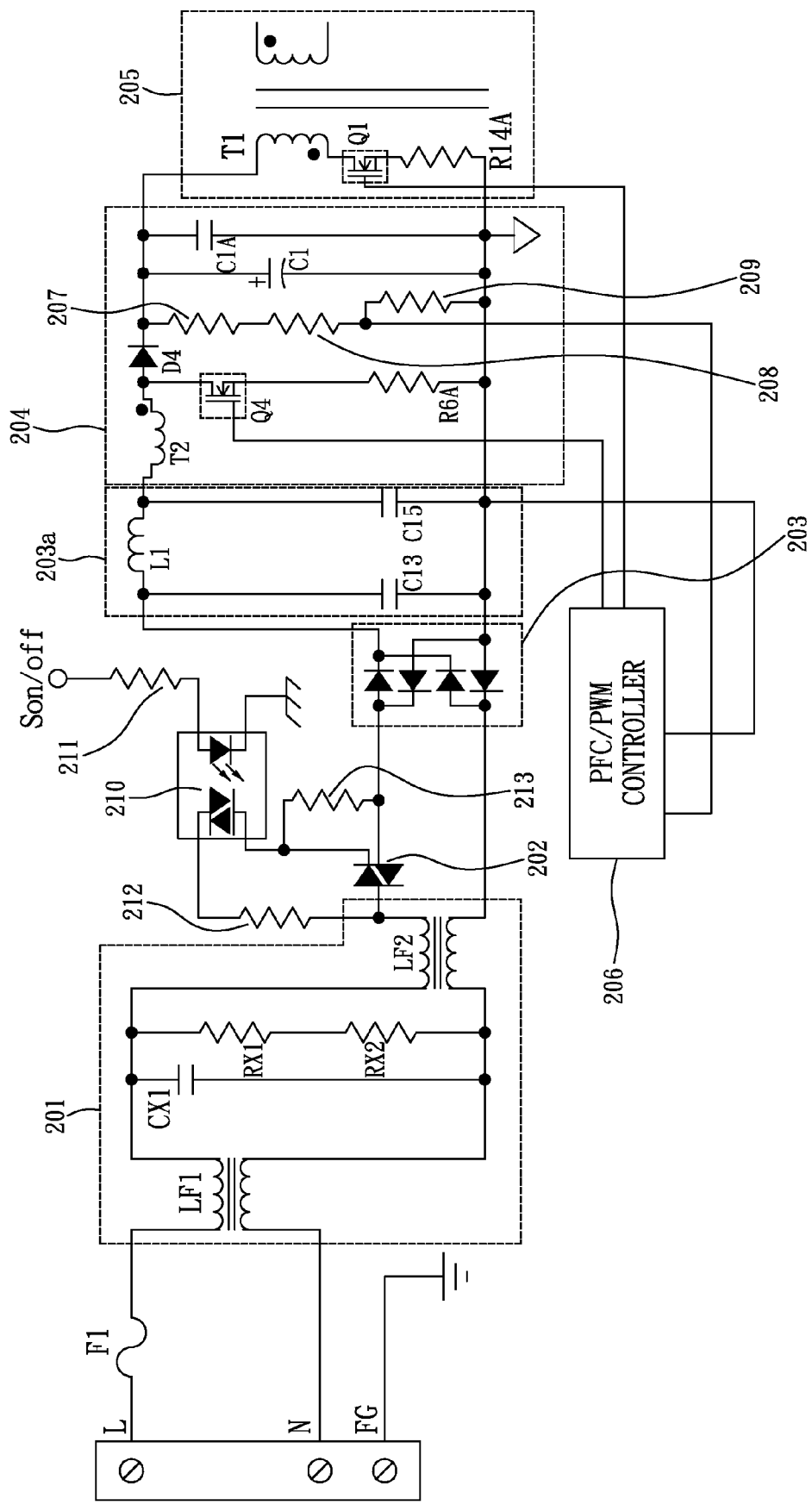
FIG. 2 is the circuit diagram of a power converter according to a preferred embodiment of the present invention (excluding the output rectifying and filtering unit and the voltage feedback circuit).

Please refer to FIG. 2, which shows the circuit diagram of a power converter according to a preferred embodiment of the present invention (excluding the output rectifying and filtering unit and the voltage feedback circuit). As shown in FIG. 2, the power converter with extremely low standby power consumption, for converting an input AC power to an output DC power according to the preferred embodiment of the present invention, comprises an EMI filter 201, a TRIAC 202, an input rectifying and filtering unit 203, an EMI filter 203a, a power factor boosting circuit 204, a main transformer 205, a PFC/PWM controller 206, a resistor 207, a resistor 208, a resistor 209, a photo coupling TRIAC driver 210, a resistor 211, a resistor 212 and a resistor 213.

In FIG. 2, the EMI filter 201 is placed between the input AC power and the TRIAC 202 to filter out possible EMI (Electro Magnetic Interference) generated in the power converter.

The TRIAC 202 has a gate, a first channel terminal and a second channel terminal. The first channel terminal is coupled to the EMI filter 201 to access the input AC power. The second channel terminal is coupled to the input rectifying and filtering unit 203. The gate is coupled to the photo coupling TRIAC driver 210. The channel between the first channel terminal and the second channel terminal of the TRIAC 202 is either in conduction or in isolation according to the control of the photo coupling TRIAC driver 210 through the gate. When the channel between the first channel terminal and the second channel terminal is in conduction, the power converter operates in the normal conversion mode. When the channel between the first channel terminal and the second channel terminal is in isolation, the power converter operates in the AC power interruption mode.

The input rectifying and filtering unit 203 is coupled to the second channel terminal of the TRIAC 202 to perform full-wave rectifying and filtering operation on the input AC power to provide a ripple voltage.

The EMI filter 203a is placed between the input rectifying and filtering unit 203 and the power factor boosting circuit 204 to filter out possible EMI (Electro Magnetic Interference) generated in the power converter.

The power factor boosting circuit 204 having an MOS transistor Q4 is placed between the input rectifying and filtering unit 203 and the main transformer 205, and used to convert the ripple voltage to a first voltage to boost the power factor, under the control of the PFC/PWM controller 206.

The main transformer 205 is for generating a second voltage according to the first voltage. The second voltage is further converted by an output rectifying and filtering unit (not shown in FIG. 2) to provide the output DC power.

The PFC/PWM controller 206, for example but not limited to TEA1751, provides a power factor correction driving signal to drive the MOSFET transistor Q4 of the power factor boosting circuit 204, and provides a pulse width modulation signal (not shown in the FIG. 2) to conduct the regulation of the output DC power.

The resistor 207, resistor 208 and resistor 209 constitute a voltage dividing circuit to provide a voltage dividing signal of the first voltage to the PFC/PWM controller 206, and a power factor correction driving signal is generated from the PFC/PWM controller 206 to drive the MOSFET transistor Q4 of the power factor boosting circuit 204 to boost the power factor.

The photo coupling TRIAC driver 210 has a control side and a channel side. One terminal of the control side is coupled to a switch signal $S_{on/off}$ of a loading device (not shown in FIG. 2) through the resistor 211, and the other terminal of the control side is coupled to the reference ground of the switch signal $S_{on/off}$. One terminal of the channel side is coupled to the gate of the TRIAC 202, and the other terminal of the channel side is coupled to the resistor 212. When the switch signal $S_{on/off}$ is at high level, the channel side will then generate a driving current to enable electrical connection of the first channel terminal and the second channel terminal of the TRIAC 202. When the switch signal $S_{on/off}$ is at low level, the channel side will then be off and cause electrical isolation of the first channel terminal and the second channel terminal of the TRIAC 202.

The resistor 211 is placed at the control side to limit the current of the control side and thereby protects the photo coupling TRIAC driver 210.

The resistor 212 is placed between the first channel terminal of the TRIAC 202 and the other terminal of the channel side of the photo coupling TRIAC driver 210, and used to protect the photo coupling TRIAC driver 210.

The resistor 213 has one terminal coupled to the gate of the TRIAC 202, and the other terminal coupled to the second channel terminal of the TRIAC 202, to enhance the noise immunity and thermal stability of the TRIAC 202.

Therefore, through the implementation of the present invention to switch the TRIAC with the photo coupling TRIAC driver, a power converter capable of complying with the standby demand is proposed. Besides, the photo coupling TRIAC driver is cost effective and only consumes extremely low power, so the present invention does overcome the drawbacks of prior art.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. A power converter with extremely low standby power consumption for converting an input AC power to an output DC power, comprising:
   an EMI filter, coupled to said AC input power to filter electro-magnetic interference;
   a TRIAC switch, having a gate, a first channel terminal and a second channel terminal, said first channel terminal coupled to said EMI filter to access said AC input power;
   a TRIAC driver, used for driving said gate of said TRIAC switch according to an on-off control signal from a loading device, to control the electric connection of said first channel terminal and said second channel terminal; and
   a PFC/PWM controller, used to generate a power factor correction driving signal according to a power factor correction sensing signal, and generate a pulse width modulation signal according to a feedback voltage.

2. The power converter according to claim 1, wherein said TRIAC driver is a photo coupling TRIAC driver, which has a control side and a channel side; when a current is flowing through said control side, said channel side is in conduction and thereby enables the electrical connection of said first channel terminal and said second channel terminal; when no current is flowing through said control side, said channel side is in off state and so as to disable the electrical connection of said first channel terminal and said second channel terminal.

3. The power converter according to claim 2, wherein said control side is driven by said on-off control signal from said loading device.

4. The power converter according to claim 3, further comprising a protection resistor, which is placed between said TRIAC switch and said TRIAC driver, to protect said TRIAC driver.

5. The power converter according to claim 4, further comprising a gate resistor, which has one end coupled to said gate of said TRIAC switch, and the other end coupled to said first channel terminal or said second channel terminal to enhance noise immunity and thermal stability of said TRIAC switch.

6. The power converter according to claim 5, further comprising an input rectifying and filtering unit, which is coupled to said second channel terminal of said TRIAC switch, to generate a first voltage.

7. The power converter according to claim 6, further comprising a main transformer, used to generate a second voltage according to said first voltage.

8. The power converter according to claim 7, further comprising an output rectifying and filtering unit, used to generate said output DC power according to said second voltage.

9. The power converter according to claim 8, further comprising a voltage feedback circuit, which is coupled to said output rectifying and filtering unit to provide said feedback voltage.

10. The power converter according to claim 1, further comprising a power factor boosting circuit, which has a MOSFET transistor, used to boost the power factor according to said power factor correction driving signal.

11. The power converter according to claim 10, wherein said loading device can be any portable electronic equipment.

* * * * *